US011220199B1

(12) United States Patent
Namyst, III

(10) Patent No.: US 11,220,199 B1
(45) Date of Patent: Jan. 11, 2022

(54) SAUCE TO GO CONTAINER

(71) Applicant: Convenience Designs LLC, White Plains, MD (US)

(72) Inventor: Joseph Alexander Namyst, III, Bensville, MD (US)

(73) Assignee: Convenience Designs LLC, White Plains, MD (US)

( * ) Notice: Subject to any disclaimer, the term of this patent is extended or adjusted under 35 U.S.C. 154(b) by 0 days.

(21) Appl. No.: 16/576,681

(22) Filed: Sep. 19, 2019

Related U.S. Application Data

(60) Provisional application No. 62/765,892, filed on Sep. 20, 2018.

(51) Int. Cl.
*B60N 3/10* (2006.01)
(52) U.S. Cl.
CPC .................................... *B60N 3/103* (2013.01)
(58) Field of Classification Search
CPC .......... B60N 3/103; B60N 3/10; B60N 3/002; B60N 3/107; A45C 11/20; A45F 2200/0583; A45F 2200/0566; B60R 7/04
USPC ....................................................... 224/544
See application file for complete search history.

(56) References Cited

U.S. PATENT DOCUMENTS

| | | | | |
|---|---|---|---|---|
| 6,732,990 | B2 * | 5/2004 | Hudson | B60N 3/002 206/503 |
| 7,377,381 | B2 * | 5/2008 | Dziaba | A45C 11/20 206/45.24 |
| 10,384,580 | B2 * | 8/2019 | Medina Luna | B60N 3/002 |
| 2002/0043603 | A1 * | 4/2002 | Thomas | B60N 3/103 248/311.2 |
| 2014/0326768 | A1 * | 11/2014 | Mango | B60N 3/104 224/542 |
| 2019/0283646 | A1 * | 9/2019 | Koury | B60N 3/107 |
| 2020/0002054 | A1 * | 1/2020 | Gronkowski | A47G 19/2288 |

* cited by examiner

*Primary Examiner* — Corey N Skurdal
(74) *Attorney, Agent, or Firm* — John Gladstone Mills, III; Patent Counsel Group LLP

(57) ABSTRACT

The invention of a "sauce to go container" provides a convenient way to hold sauces or condiments from restaurants in a motor vehicle without tipping or spilling the sauce on the interior of the automobile or its occupants. The sauce to go container is designed to slide into and fit snuggly into the cup holder or drink caddie with is standard in most motor vehicles, thereby holding the sauce from a restaurant or convenience store without spilling. The container has an opening at the top of the container for holding the sauce dish that is provided to customers in many restaurants for a "to go" order. The container holds the sauces or condiments securely to avoid sauce spills and stain damage to clothing as well as the car's interior.

6 Claims, 3 Drawing Sheets

SAUCE TO GO CONTAINER

RELATED DESIGN PATENT

This utility patent application for a Sauce to Go Container, filed on Sep. 19, 2019, is related to design patent application 29/583754, issued on Oct. 30, 2018 as U.S. Pat. D 832,057. This patent application discloses the utility aspects of the invention that were not claimed in the design patent.

BACKGROUND OF THE INVENTION AND PRIOR ART

The invention relates generally to a container for holding sauces or syrups for food toppings that may be applied in an automobile or other transport vehicle. The container is designed to fit into an automobile cup holder or vehicle drink caddy.

The limitations of the prior art in this area suggest the need for such a container that will not spill or be easily turned over in an automobile or motor vehicle context.

The prior art suggests that a sauce holder or cup holder could be fastened to air vents on the dashboard of an automobile or motor vehicle, but such a design for a sauce holder could be easily knocked over and could easily interfere with the operation of the automobile or motor vehicle.

U.S. Pat. No. 7,611,114 to a Portable Music Player Holder is directed to a device for holding a digital audio player in a cup holder of a vehicle. This patent is not directed to a sauce holder as is the instant invention.

U.S. Pat. No. 6,883,692 to a Sauce Holder for an Arm Rest is directed to a multifunctional tray for holding a variety of food and beverage items. This patent is not directed to a sauce holder that is placed directly in the vehicle's cup holder.

In view of these teachings and disclosures of holders for food and beverages in an automobile or motor vehicle, it is apparent that there is a need for a more convenient device or apparatus to carry and contain sauces in a motor vehicle without spillage or damage to the vehicle. A sauce holder is placed on the seat or console next to the person who is using the device can potentially slide off of the seat or console, or tip over, thus spilling the contents of the holder.

There is a genuine need for a device that holds sauces and condiments securely in an automobile or motor vehicle without the possibility of spilling. This invention of a Sauce to Go Container would overcome the disadvantages of the prior art by being reusable, readily adaptable to cup holders in many vehicles, and easy to use.

SUMMARY OF THE INVENTION

The present invention relates to a container for holding sauces or syrups for food toppings in an automobile or motor vehicle. The container is designed to fit into the automobile's or motor vehicle's cup holder. The container has an opening at the top of the container for holding the sauce dish that is provided to customers in many restaurants for a "to go" order. The invention is easily cleaned and greatly adaptable to many cup holders in different motor vehicles. The container holds the sauce securely to avoid sauce spills and stain damage to clothing as well as the car's interior.

DETAILED DESCRIPTION OF THE INVENTION

Figure 1:
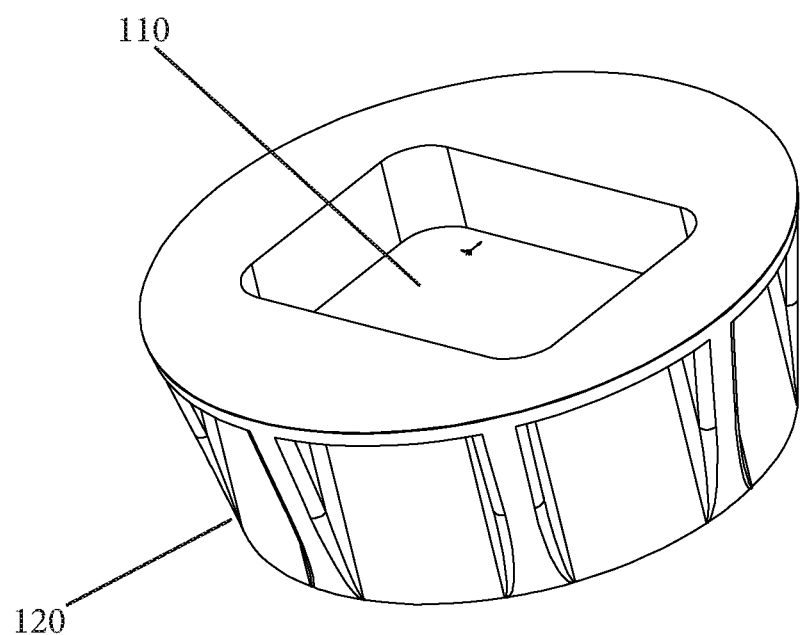
FIG. 1 is a drawing of the Sauce to Go Container.

The present invention relates to a sauce container for food toppings which may be inserted into the cup holder of an automobile or motor vehicle.

The container is manufactured using food grade polystyrene and manufactured using an injection molding process.

The approximate size of the preferred embodiment shown in the drawings is 3.5 inches wide at the top, 1.25" deep, and 2.8" wide at the bottom. The container also has a rectangular recessed area that is about 1.5"×2.2" to accommodate a rectangular sauce packet that a user may receive from a restaurant, food store, grocery store, or "fast food" outlet.

Because the sauces at different restaurants have various shapes and sizes, it will be necessary to make some of the holders taller than 1.25", thus making it narrower than 2.8", as the shape must be a cone in order to fit the various sizes of automotive cup holders and drink caddies. Similarly, the shape of the cavity that holds the sauce packets may be adjusted to fit the size and shape of the sauce dish that is intended to be used.

The slight modifications in the cavity that holds the sauce would be tailored to the particular restaurant for which the holder is being manufactured. The attached drawings of the preferred embodiment are designed for the sauce containers that are used by Chick-fil-A and this particular version would be specifically manufactured for their sauce packet or dish.

A top view of the sauce to go container is shown in FIG. 1. As shown in the figure, the rectangular recessed area in the top is the cavity that holds the dipping sauce secure (FIG. 1—110). As shown in the drawing, the sides are tapered in order to fit in a variety of automotive cup holders and drink cadies in an automobile or motor vehicle (FIG. 1—120). Other variations would be required when manufacturing to accommodate the sauces of other entities.

Figure 2:
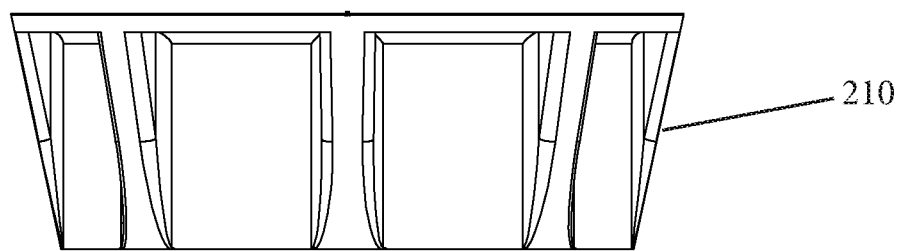
FIG. 2 is a drawing of a side view of the Sauce to Go Container.

A side view of the sauce to go container is shown in FIG. 2. As shown in the figure, the sides are tapered so that the container will slide snuggly into place and stay securely in an automobile or motor vehicle drink caddie or cup holder (FIG. 2—210).

The extended depth of the Sauce to Go Containers could be used as a storage place for additional sauce containers. This may be accomplished by adding a detachable "lid" that would be attached to the bottom of the holder in the similar fashion of a lid on a can of peanuts or plastic food storage device.

Figure 3:
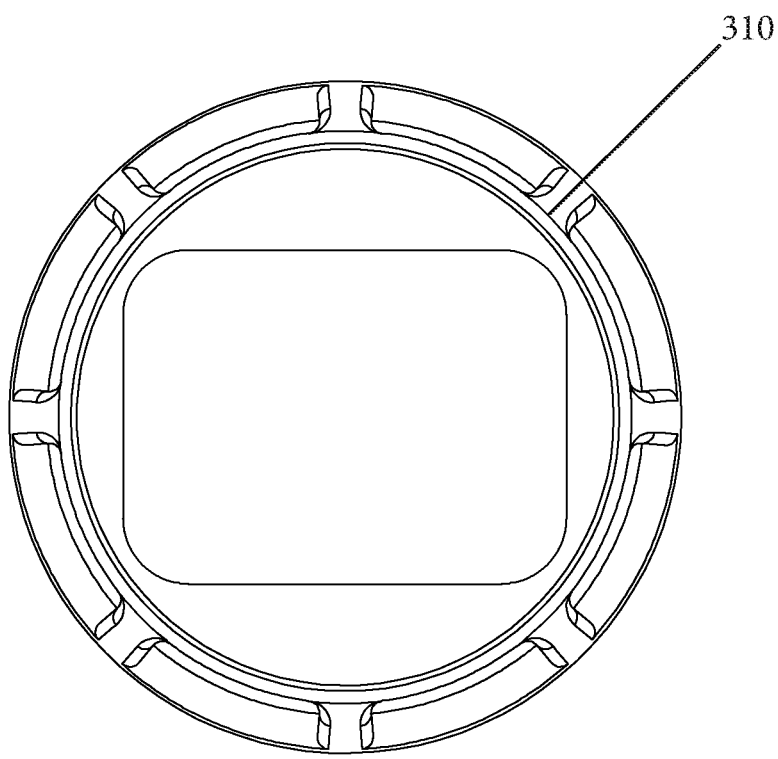
FIG. 3 is a drawing of a top down view of the Sauce to Go Container.

A bottom view of the Sauce to Go Container is shown in FIG. 3. As shown in the drawing, there is a ring around the bottom of the Sauce to Go Container to accommodate a lid (FIG. 3—310). This lid permits storage of additional sauce packets in the bottom of the container for the convenience of the user.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to a certain preferred embodiment thereof, other embodiments are possible. Therefore, the spirit and scope of the appended claims should not be limited to the description of the preferred embodiment(s) contained herein.

The invention claimed is:

1. A holder for edible sauces or condiments in a motor vehicle comprising:
 a member shaped to retain an edible sauce or condiment;
  said member being shaped to fit into a motor vehicle cup holder so that the motor vehicle cup holder holds the member snuggly so that movement and vibration of the motor vehicle does not spill the edible sauce or condiment onto a passenger or into the motor vehicle;
  said member having a cavity shaped to hold a sauce or condiment packet from a restaurant; and
 a lid attached under the cavity for storing said sauce or condiment packet between the lid and the cavity that holds said sauce or condiment packet, whereby one or more sauce or condiment packets is stored between said cavity and said lid.

2. The holder of claim 1, wherein said member is made from food grade polystyrene.

3. The holder of claim 1, wherein said member is produced from an injection molding process.

4. The holder of claim 1, wherein the cavity is shaped to hold a sauce packet from a variety of different restaurants.

5. The holder of claim 1, wherein the member has a cone shape with tapered sides which enable the member to fit into a variety of motor vehicle cup holders.

6. The holder of claim 1, wherein the member is capable of sliding into a motor vehicle cup holder until said member having a cone shape with said tapered sides is snug with the side of the motor vehicle cup holder.

* * * * *